United States Patent
Buisine et al.

(10) Patent No.: US 12,479,724 B2
(45) Date of Patent: Nov. 25, 2025

(54) BIS(FLUOROSULFONYL)IMIDE SALTS AND PREPARATION METHOD THEREOF

(71) Applicant: SYENSQO SA, Brussels (BE)

(72) Inventors: Olivier Buisine, Saint Genis-Laval (FR); Yeon-Joon Kim, Seoul (KR); Byeong-Ki Kim, Seoul (KR)

(73) Assignee: SYENSQO SA, Brussels (BE)

( * ) Notice: Subject to any disclaimer, the term of this patent is extended or adjusted under 35 U.S.C. 154(b) by 763 days.

(21) Appl. No.: 17/769,551

(22) PCT Filed: Oct. 13, 2020

(86) PCT No.: PCT/EP2020/078765
§ 371 (c)(1),
(2) Date: Apr. 15, 2022

(87) PCT Pub. No.: WO2021/074142
PCT Pub. Date: Apr. 22, 2021

(65) Prior Publication Data
US 2024/0132352 A1  Apr. 25, 2024
US 2024/0228283 A9  Jul. 11, 2024

(30) Foreign Application Priority Data
Oct. 15, 2019 (EP) .................................... 19203159

(51) Int. Cl.
| | |
|---|---|
| *C01B 21/086* | (2006.01) |
| *B01D 9/00* | (2006.01) |
| *C01B 21/093* | (2006.01) |
| *C07C 303/42* | (2006.01) |
| *C07C 311/48* | (2006.01) |
| *H01M 10/0568* | (2010.01) |

(52) U.S. Cl.
CPC .............. *C01B 21/093* (2013.01); *B01D 9/00* (2013.01); *C01B 21/086* (2013.01); *C07C 303/42* (2013.01); *C07C 311/48* (2013.01); *H01M 10/0568* (2013.01); *C01P 2006/40* (2013.01); *C01P 2006/80* (2013.01); *C07B 2200/13* (2013.01); *H01M 2300/0025* (2013.01)

(58) Field of Classification Search
None
See application file for complete search history.

(56) References Cited

U.S. PATENT DOCUMENTS

| | | |
|---|---|---|
| 2013/0331609 A1 | 12/2013 | Tsubokura et al. |
| 2018/0370799 A1 | 12/2018 | Lim |
| 2019/0089001 A1 | 3/2019 | Kim et al. |
| 2019/0276311 A1 | 9/2019 | Itayama et al. |

FOREIGN PATENT DOCUMENTS

| | | | | |
|---|---|---|---|---|
| FR | 2975694 | * | 11/2012 | |
| JP | 2014105115 A | | 6/2014 | |
| JP | 2016124735 A | | 7/2016 | |
| JP | 2016145147 A | | 8/2016 | |
| KR | 20170083368 A | | 7/2017 | |
| WO | WO2009123328 | * | 10/2009 | |
| WO | WO-2009123328 A1 | * | 10/2009 | ........... C07C 303/40 |
| WO | 17126851 A1 | | 7/2017 | |
| WO | 18161025 A1 | | 9/2018 | |
| WO | 2018161025 | * | 9/2018 | |
| WO | WO-2018161025 A1 | * | 9/2018 | ........... C01B 21/086 |

OTHER PUBLICATIONS

Fischer Scientific Sodium Bis(fluorosulfonyl)imide. https://www.fishersci.com/shop/products/sodium-bis-fluorosulfonyl-imide-tci-america-2/S09921G 2025 (Year: 2025).*
International Search Report issued in International Application No. PCT/EP2020/078765, mailed Nov. 13, 2020 (3 pages).
Written Opinion issued in International Application No. PCT/EP2020/078765, mailed Nov. 13, 2020 (5 pages).

* cited by examiner

*Primary Examiner* — Sheng H Davis
(74) *Attorney, Agent, or Firm* — Osha Bergman Watanabe & Burton LLP

(57) ABSTRACT

The present invention relates to bis(fluorosulfonyl)imide salts, and their preparation methods. More specifically, the invention provides a new salt of bis(fluorosulfonyl)imide containing from 0.01 ppm to 10000 ppm of a halogenated alcohol. The invention further relates to a method for producing said salt of bis(fluorosulfonyl)imide, said method comprising a step of crystallizing a raw salt of bis(fluorosulfonyl)imide within a crystallization solvent comprising at least a halogenated alcohol. The use of said salt of bis(fluorosulfonyl)imide is also disclosed.

7 Claims, 1 Drawing Sheet

BIS(FLUOROSULFONYL)IMIDE SALTS AND PREPARATION METHOD THEREOF

TECHNICAL FIELD

The present invention relates to bis(fluorosulfonyl)imide salts, and their preparation methods. More specifically, the invention provides a new salt of bis(fluorosulfonyl)imide with improved quality, and which may be obtained by a new efficient and cost-effective method.

BACKGROUND ART

Bis(fluorosulfonyl)imide (commonly represented by "FSIH") and salts thereof, in particular the lithium salt of bis(fluorosulfonyl)imide (commonly represented by "LiFSI"), are useful as intermediate compound or as final compound in a variety of technical field.

The production of bis(fluorosulfonyl)imide and of the lithium salt of bis(fluorosulfonyl)imide is widely described in the literature. Among the various technologies described, the majority uses a fluorination reaction either with HF or with metal fluorides, like KF, CsF, $AsF_3$, $SbF_3$, $CuF_2$, $ZnF_2$, $SnF_2$, $PbF_2$, $BiF_3$, etc. Other technologies have been developed, for example using chlorosulfonyl isocyanate in the presence of oleum and of ammonium fluoride or using urea and fluorosulfonic acid.

Bis(fluorosulfonyl)imide and salts thereof are especially useful in battery electrolytes. For this type of use, the presence of impurities is an important issue.

To suppress the contamination of metal impurities, the prior art document US 2013/0331609 suggests a process for producing a fluorosulfonylimide ammonium salt including reacting a chlorosulfonylimide compound with a fluorinating agent of formula $NH_4F(HF)_p$, wherein p is 0 to 10. The thus obtained fluorosulfonylimide ammonium salt may be subjected to a cation exchange reaction to produce another fluorosulfonylimide salt. This process is said to be industrially efficient and to provide no metal impurities.

Similarly, prior art documents JP 2016-124735 and JP 2016-145147 disclose a method for producing a fluorosulfonylimide compound comprising the reaction of a chlorosulfonylimide compound with $NH_4F(HF)_p$, wherein p is 0 to 10. Said fluorosulfonylimide compound may be reacted with an alkali metal compound to produce an alkali metal salt of fluorosulfonylimide.

The prior art document US 2018/0370799 discloses a method for producing lithium bis(fluorosulfonyl)imide in a high yield and with high purity. Said method consists in reacting bis(chlorosulfonyl)imide compound with a fluorination reagent, and then immediately treating the same with an alkali reagent, thereby producing ammonium bis(fluorosulfonyl)imide, and reacting the ammonium bis(fluorosulfonyl)imide with a lithium base.

Even if these documents claim that the products are obtained with a high purity, we believe that there is still room for improvement. For instance, US 2018/0370799 even discloses that additional recrystallization of the concentrated, purified and recrystallized lithium bis(fluorosulfonyl)imide product is necessary to remove insoluble components, and finally to obtain lithium bis(fluorosulfonyl)imide product having the desired high purity of 99.9% or above.

In this context, we believe that an improved method for producing bis(fluorosulfonyl)imide and salts thereof which is economically feasible at industrial scale and which provides a high-purity product is still desirable. In addition, one object of the present invention is to provide new salts of bis(fluorosulfonyl)imide having improved quality, and which may be obtained by new efficient and cost-effective methods.

BRIEF DESCRIPTION OF THE INVENTION

One subject-matter of the invention is a salt of bis(fluorosulfonyl)imide containing from 0.01 ppm to 10000 ppm of a halogenated alcohol. Said salt is preferably an onium salt of bis(fluorosulfonyl)imide, more preferably a quaternary ammonium salt of bis(fluorosulfonyl)imide, even more preferably ammonium bis(fluorosulfonyl)imide.

One further subject-matter of the present invention is a method for producing said salt of bis(fluorosulfonyl)imide, said method comprising a step of crystallizing a raw salt of bis(fluorosulfonyl)imide within a crystallization solvent comprising at least a halogenated alcohol.

One further subject-matter of the present invention is the use of said salt of bis(fluorosulfonyl)imide, as a starting material to produce another salt of bis(fluorosulfonyl)imide. Additionally, the present invention claims a method for producing an alkali salt of bis(fluorosulfonyl)imide, said method comprises the steps consisting of producing a crystallized salt of bis(fluorosulfonyl)imide as defined above, and reacting said crystallized salt of bis(fluorosulfonyl)imide with an alkali agent to obtain alkali salt of bis(fluorosulfonyl)imide.

DESCRIPTION OF THE INVENTION

Figure 1:
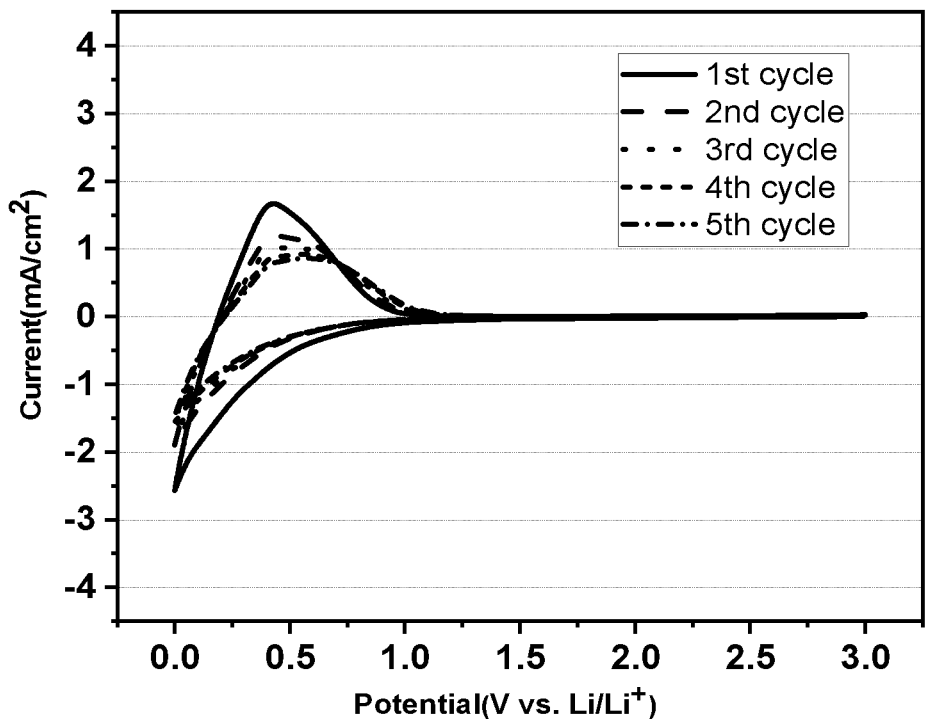
FIG. 1 shows a cyclic voltammetry diagram obtained by cycling 5 times the solution of LiFSI at 30 wt. % in EMC obtained in Example 2.

In the present disclosure, the expression "comprised between . . . and . . . " should be understood has including the limits. Unless otherwise specified, one part per million denotes one part in weight per 1 000 000 parts in weight. It can be equally abbreviated "ppm", "ppmw" or "mg/kg".

One subject-matter of the present invention relates to a salt of bis(fluorosulfonyl)imide. Said salt can be represented by the formula (I):

$$[(FSO_2)_2N^-]_n M^{n+} \qquad (I)$$

wherein $M^{n+}$ represents a cation, and n is an integer from 1 to 3 representing the valence of the cation M. Preferably, n is 1 or 2; more preferably n is 1.

According to a first embodiment, $M^{n+}$ represents an onium cation. The onium cation $M^{n+}$ may be selected from the group consisting of quaternary ammonium, imidazolium, pyrazolium, pyridinium, pyrrolidinium, piperidinium, morpholinium, quaternary phosphonium, tertiary phosphine, sulfonium, guanidinium, isouronium and isothiouronium. More preferably, the onium cation $M^{n+}$ may be selected from the group consisting of quaternary ammonium compounds, in particular from tetramethylammonium and ammonium cations (n=1 in formula (I) in such case). Even more preferably, $M^{n+}$ represents ammonium cation $NH_4+$. Consequently, the salt of bis(fluorosulfonyl)imide according to the invention is preferably an onium salt of bis(fluorosulfonyl)imide, more preferably a quaternary ammonium salt of bis(fluorosulfonyl)imide, even more preferably ammonium bis(fluorosulfonyl)imide, which may be represented by the formula $NH_4\ N(SO_2F)_2$ (which may be referred to as "NH$_4$FSI").

According to a second embodiment, $M^{n+}$ represents an alkali metal cation. The alkali metal cation may be selected from the group consisting of lithium cation, sodium cation and potassium cation, and preferably, $M^{n+}$ is lithium cation. The salt of bis(fluorosulfonyl)imide according to the invention is preferably lithium bis(fluorosulfonyl)imide, which may be represented by the formula $Li\ N(SO_2F)_2$ (which may be referred to as "LiFSI").

The salt of bis(fluorosulfonyl)imide according to the present invention is characterized by the fact that it contains some traces of a halogenated alcohol.

Said halogenated alcohol may be a fluorinated alcohol, a chlorinated alcohol or a brominated alcohol. Said halogenated alcohol is preferably a fluorinated alcohol.

In the present text, the expression "fluorinated alcohol" refers to an organofluorine compound comprising at least one alcohol functional group with at least one C—F bond. The fluorinated alcohol may be a partially fluorinated alcohol or a perfluorinated alcohol. It can preferably comprise from 1 carbon atom to 12 carbon atoms, more preferably from 1 carbon atom to 6 carbon atoms, and even more preferably from 1 carbon atom to 4 carbon atoms.

According to a preferred embodiment, the fluorinated alcohol according to the invention is a compound of formula $R_f$—OH, wherein $R_f$ is a fluorinated moiety selected from the group consisting of fluorinated alkyl, fluorinated heteroalkyl and fluorinated aryl. More preferably, $R_f$ may be:
- a C1-C4 fluorinated alkyl, more preferably it is $CH_2F$, $CHF_2$, $CF_3$, $CF_3CH_2$, $HCF_2CH_2$, $CF_3CF_2$, $CF_3CH_2CH_2$, $CF_3CF_2CH_2$, $CF_3CF_2CF_2$, $(CF_3)_2CH$, $(CF_3)_2CF$, $CF_3CF_2CF_2CF_2$, $(CF_3)_3C$; or
- a fluorinated aryl, such as a partially or fully fluorinated phenyl, more preferably $R_f$ is $C_6F_5$.

Very preferably, the fluorinated alcohol according to the invention may be selected from the group consisting of nonafluoro-tert-butanol $((CF_3)_3COH)$, hexafluoroisopropanol $((CF_3)_2CHOH)$, pentafluorophenol, difluoroethanol $(HCF_2CH_2OH)$, and trifluoroethanol $(CF_3CH_2OH)$; more preferably the fluorinated alcohol is difluoroethanol and trifluoroethanol; and even more preferably the fluorinated alcohol is trifluoroethanol.

According to the present invention, the salt of bis(fluorosulfonyl)imide is characterized by the fact that it contains from 0.01 ppm to 10000 ppm, preferably from 0.1 ppm to 5000 ppm, more preferably from 0.1 ppm to 1000 ppm, more preferably from 0.5 ppm to 500 ppm, even more preferably from 1 ppm to 100 ppm, of said halogenated alcohol.

The content of halogenated alcohol may be measured by a gas chromatography (GC) or HPLC or mass spectroscopy. Typically, head-space gas chromatography for solid compounds can be used.

Besides the halogenated alcohol, the salt of bis(fluorosulfonyl)imide according to the invention shows advantageously a very high purity. The purity is preferably above 90%, more preferably above 95%, and even more preferably between 99% and 100% (mass percent).

Preferably, it may show the following contents of anions:
- a chloride (Cl$^-$) content of below 10 000 ppm, preferably below 5 000 ppm, more preferably below 1 000 ppm, more preferably below 500 ppm, more preferably below 100 ppm, more preferably below 50 ppm, more preferably below 20 ppm; and/or
- a fluoride (F$^-$) content of below 10 000 ppm, preferably below 5 000 ppm, more preferably below 1 000 ppm, more preferably below 500 ppm, more preferably below 100 ppm, more preferably below 50 ppm, more preferably below 20 ppm; and/or
- a sulfate ($SO_4^{2-}$) content of below 30 000 ppm, preferably below 10 000 ppm, more preferably below 5 000 ppm.

It is to be understood that these anions are entities different from the salt of bis(fluorosulfonyl)imide itself. Especially, the fluoride content does not encompass the fluorine content in the molecular structure of the salt of bis(fluorosulfonyl)imide.

Preferably, it may show the following contents of metal elements:
- an iron (Fe) content of below 1 000 ppm, preferably below 800 ppm, more preferably below 500 ppm; and/or
- a chromium (Cr) content of below 1 000 ppm, preferably below 800 ppm, more preferably below 500 ppm; and/or
- a nickel (Ni) content of below 1 000 ppm, preferably below 800 ppm, more preferably below 500 ppm; and/or
- a zinc (Zn) content of below 1 000 ppm, preferably below 100 ppm, more preferably below 10 ppm, and/or
- a copper (Cu) content of below 1 000 ppm, preferably below 100 ppm, more preferably below 10 ppm; and/or
- a bismuth (Bi) content of below 1 000 ppm, preferably below 100 ppm, more preferably below 10 ppm.

Additionally, when the salt of bis(fluorosulfonyl)imide is not sodium bis(fluorosulfonyl)imide, it may show:
- a sodium (Na) content of below 10 000 ppm, preferably below 5 000 ppm, more preferably below 500 ppm.

Additionally, when the salt of bis(fluorosulfonyl)imide is not potassium bis(fluorosulfonyl)imide, it may show:
- a potassium (K) content of below 10 000 ppm, preferably below 5 000 ppm, more preferably below 500 ppm.

Water content of the bis(fluorosulfonyl)imide salt according to the invention is preferably below 10000 ppm, more preferably below 1000 ppm. Nevertheless, higher content of water could be acceptable depending on the final application of the bis(fluorosulfonyl)imide salt.

Thanks to its very high purity, the salt of bis(fluorosulfonyl)imide may be advantageously used within electrolyte compositions for batteries, or as starting material or intermediate compound for the preparation of other bis(fluorosulfonyl)imide salts which are used within electrolyte compositions for batteries.

The salt of bis(fluorosulfonyl)imide according to the invention may be on the form of a solid crystallized compound, preferably a dry solid crystallized compound, having a purity above 99.9%.

One further subject-matter of the present invention is a method for producing the salt of bis(fluorosulfonyl)imide as defined above. Said method comprises a step of crystallizing a raw salt of bis(fluorosulfonyl)imide within a crystallization solvent comprising at least a halogenated alcohol.

According to a preferred embodiment, the crystallization step according to the invention is a recrystallization step, which comprises the steps consisting of first providing a raw solid salt of bis(fluorosulfonyl)imide, then dissolving said raw solid salt of bis(fluorosulfonyl)imide within said crystallization solvent; causing the salt of bis(fluorosulfonyl) imide to crystallize; and finally recovering recrystallized salt of bis(fluorosulfonyl)imide.

The raw solid salt of bis(fluorosulfonyl)imide can be purchased as such, or produced beforehand by any method disclosed in prior art.

Said raw solid salt of bis(fluorosulfonyl)imide may be dissolved within a crystallization solvent, which crystallization solvent comprises at least a halogenated alcohol. Said halogenated alcohol may be selected as disclosed herein above. Accordingly, the halogenated alcohol may be very preferably selected from the group consisting of nonafluoro-tert-butanol (($CF_3$)$_3$COH), hexafluoroisopropanol (($CF_3$)$_2$CHOH), pentafluorophenol, difluoroethanol ($HCF_2CH_2OH$), and trifluoroethanol ($CF_3CH_2OH$), more preferably the fluorinated alcohol is difluoroethanol and trifluoroethanol, and even more preferably the fluorinated alcohol is trifluoroethanol.

According to one embodiment, the crystallization solvent consists in one halogenated alcohol or a mixture of two or more halogenated alcohols. According to another embodiment, the crystallization solvent consists in a mixture of at least one halogenated alcohol and another solvent which is not a halogenated alcohol. For instance, said another solvent may be selected from the group consisting of carbonates like ethyl methyl carbonate (EMC), and dimethyl carbonate (DMC); esters like ethyl acetate, butyl acetate, and ethyl propionate; halocarbon like dichloromethane (DCM), and 1,2-dichloroethane; aromatics like benzene, and toluene; hydrocarbon like pentane, hexane, and heptane; nitrile compounds like valeronitrile, and acetonitrile. Examples of crystallization solvent mixtures are TFE/EMC, TFE/EMC/DCM, TFE/DCM, TFE/butyl acetate/DCM, and TFE/butyl acetate. The content of halogenated alcohol within the crystallization solvent may be comprised between 1% and 95%, and more preferably between 50% and 90%. Optionally, water may also be added to the crystallization solvent, at a content which may be of between 0.01% and 20%, preferably between 0.1% and 10%, and more preferably between 1% and 5%, based on the total weight of the crystallization solvent.

The optimum dissolution may be carried out by means well known by the person skilled in the art, in a batch, semi-batch or continuous mode, typically with a suitable agitation means. The dissolution may be carried out at a temperature comprised between 25° C. and 70° C., preferably between 40° C. and 70° C., and even more preferably between 50° C. and 60° C. Preferably, the dissolution is carried out at atmospheric pressure, but it is not excluded to work below or above atmospheric pressure, for instance between 800 mbar and 1.2 bar.

After dissolution, the crystallization of the salt of bis(fluorosulfonyl)imide may be caused by means well known by the person skilled in the art, in a batch, semi-batch or continuous mode. The design of the crystallization device may be decided by the person skilled in the art. The means causing the crystallization may be a decrease of the temperature at fixed pressure, a decrease of the temperature combined with a decrease of the pressure, or a distillation of at least one part of the crystallization solvent. Additionally, seeding may be carried out.

The separation of the crystallized salt of bis(fluorosulfonyl)imide may be performed by any typical separation means known by the person skilled in the art, for example by filtration. Filtration may be carried out at atmospheric pressure, under pressure or under vacuum, by any means known by the person skilled in the art. Mesh size of the filtration medium may be preferably of 2 micrometer or below, more preferably of 0.45 micrometer or below, and even more preferably of 0.22 micrometer or below. Separated product may be washed once or several times with appropriate solvent.

Finally, the crystalized solid salt of bis(fluorosulfonyl)imide is preferably dried to obtain a pure dry product. Drying step may be carried out by any means known by the person skilled in the art, typically under reduced pressure and/or by heating and/or with an inert gas flow, typically a nitrogen flow.

The method according to the present invention provides advantageously a dry solid crystallized salt of bis(fluorosulfonyl)imide according to the invention, which shows a very high purity. As explained above, thanks to its very high purity, the salt of bis(fluorosulfonyl)imide may be advantageously used within electrolyte compositions for batteries, or as starting material or intermediate compound for the preparation of other bis(fluorosulfonyl)imide salts which are used within electrolyte compositions for batteries.

One embodiment wherein the salt of bis(fluorosulfonyl)imide is an onium salt of bis(fluorosulfonyl)imide is now described. According to said embodiment, the raw solid onium salt of bis(fluorosulfonyl)imide may be produced according to the following process:
  reacting bis(chlorosulfonyl)imide or salts thereof with an onium fluoride to produce the onium salt of bis(fluorosulfonyl)imide; and
  precipitating and separating the onium salt of bis(fluorosulfonyl)imide.

According to a particular embodiment wherein the salt of bis(fluorosulfonyl)imide is a quaternary ammonium salt of bis(fluorosulfonyl)imide (such as ammonium bis(fluorosulfonyl)imide or tetramethylammonium bis(fluorosulfonyl)imide), the raw solid quaternary ammonium salt of bis(fluorosulfonyl)imide may be produced according to the following process:
  reacting bis(chlorosulfonyl)imide or salts thereof with a quaternary ammonium fluoride to produce the quaternary ammonium salt of bis(fluorosulfonyl)imide; and
  precipitating and separating the quaternary ammonium salt of bis(fluorosulfonyl)imide.

According to one specific embodiment wherein the salt of bis(fluorosulfonyl)imide is ammonium bis(fluorosulfonyl)imide, the raw solid ammonium bis(fluorosulfonyl)imide may be produced according to the following process:
  reacting bis(chlorosulfonyl)imide or salts thereof with ammonium fluoride to produce ammonium salt of bis(fluorosulfonyl)imide; and
  precipitating and separating the ammonium salt of bis(fluorosulfonyl)imide.

Bis(chlorosulfonyl)imide or salts thereof is used as raw material. It may be represented by the formula:

wherein X represents one from the group consisting of H, Li, Na, K, Cs and $NH_4$.

According to a preferred embodiment, the raw material is bis(chlorosulfonyl)imide of formula (Cl—$SO_2$)$_2$—NH (commonly represented by CSIH). CSIH is commercially available, or produced by a known method, for example:
  by reacting chlorosulfonyl isocyanate $ClSO_2NCO$ with chlorosulfonic acid $ClSO_2OH$;
  by reacting cyanogen chloride CNCl with sulfuric anhydride $SO_3$, and with chlorosulfonic acid $ClSO_2OH$;
  by reacting sulfamic acid $NH_2SO_2OH$ with thionyl chloride $SOCl_2$ and with chlorosulfonic acid $ClSO_2OH$.

According to this embodiment, the fluorinating agent is an onium fluoride, and may be more particularly a quaternary ammonium fluoride such as ammonium fluoride or tetramethylammonium fluoride. Within the present invention, the expression "onium fluoride" also includes HF adducts of onium fluorides. According to one specific embodiment, the fluorinating agent is ammonium fluoride $NH_4F$. Within the present invention, the expression "ammonium fluoride" thus includes HF adducts of ammonium fluoride, for example $NH_4F(HF)_n$, wherein n is 1 to 10, preferably 1 to 4, more preferably $NH_4F \cdot HF$ or $NH_4F(HF)_2$. The fluorinating agent may be commercially available, or produced by a known method.

According to a preferred embodiment, the onium fluoride (more particularly the quaternary ammonium fluoride, even more particularly the ammonium fluoride) is anhydrous. Moisture content may be preferably below 5000 ppm, more preferably below 1000 ppm, even more preferably below 500 ppm.

The amount of onium fluoride (more particularly of quaternary ammonium fluoride, even more particularly of ammonium fluoride) used is preferably comprised between 1 and 10 equivalents, more preferably between 1 and 7 equivalents, and even more preferably between 2 and 5 equivalents, per 1 mol of the bis(chlorosulfonyl)imide or the salt thereof.

The reaction may be carried out preferably in an organic solvent. Said organic solvent may be selected from the aprotic organic solvents, preferably:
- cyclic and acyclic carbonates, for instance ethylene carbonate, propylene carbonate, butylene carbonate, dimethyl carbonate, ethyl methyl carbonate, diethyl carbonate,
- cyclic and acyclic esters, for instance gamma-butyrolactone, gamma-valerolactone, methyl formate, methyl acetate, methyl propionate, ethyl acetate, ethyl propionate, isopropyl acetate, propyl propionate, butyl acetate,
- cyclic and acyclic ethers, for instance diethylether, diisopropylether, methyl-t-butylether, dimethoxymethane, 1,2-dimethoxyethane, tetrahydrofuran, 2-methyltetrahydrofuran, 1,3-dioxane, 4-methyl-1,3-dioxane, 1,4-dioxane,
- amide compounds, for instance N,N-dimethylformamide, N-methyl oxazolidinone,
- sulfoxide and sulfone compounds, for instance sulfolane, 3-methylsulfolane, dimethylsulfoxide,
- cyano-, nitro-, chloro- or alkyl-substituted alkane or aromatic hydrocarbon, for instance acetonitrile, valeronitrile, adiponitrile, benzonitrile, nitromethane, nitrobenzene.

According to a preferred embodiment, the organic solvent is selected from the group consisting of ethyl acetate, isopropyl acetate, butyl acetate, ethylene carbonate, dimethyl carbonate, ethyl methyl carbonate, propylene carbonate, valeronitrile and acetonitrile.

According to a preferred embodiment, the organic solvent is anhydrous. Moisture content may be preferably below 5000 ppm, more preferably below 1000 ppm, more preferably below 500 ppm, more preferably below 100 ppm even more preferably below 50 ppm.

The reaction may be carried out at a temperature of between 0° C. and 200° C., preferably, between 30° C. and 100° C. Preferably, the reaction is carried out at atmospheric pressure, but it is not excluded to work below or above atmospheric pressure, for instance between 800 mbar and 1.2 bar.

The reaction may be carried out in a batch, semi-batch or continuous mode. According to a preferred embodiment, the onium fluoride (which may be more particularly a quaternary ammonium fluoride and even more particularly ammonium fluoride) is first added to the organic solvent. Then, the bis(chlorosulfonyl)imide or a salt thereof may be added to the reaction medium.

By reacting bis(chlorosulfonyl)imide or salts thereof with an onium fluoride (more particularly a quaternary ammonium fluoride, even more particularly ammonium fluoride) according to the present invention, an onium salt of bis (fluorosulfonyl)imide (more particularly a quaternary ammonium salt of bis(fluorosulfonyl)imide, even more particularly ammonium salt of bis(fluorosulfonyl)imide) can be obtained.

After reacting bis(chlorosulfonyl)imide or salts thereof with the onium fluoride (or more particularly the quaternary ammonium fluoride even more particularly ammonium fluoride), but before precipitating and separating the onium salt of bis(fluorosulfonyl)imide (or more particularly the quaternary ammonium salt of bis(fluorosulfonyl)imide even more particularly the ammonium salt of bis(fluorosulfonyl)imide), the method according to this embodiment may comprise a step which consists in adding a basic compound to the reaction medium. Said basic compound may be a solid, a pure liquid, an aqueous or organic solution or a gas. Said basic compound may be selected from the group consisting of gaseous ammonia, ammonia water, amines, hydroxide, carbonates, phosphates, silicates, borates, formates, acetates, stearates, palmitates, propionates or oxalates of alkali or alkaline-earth metal. Among amines, any type of amines may be convenient, including, aliphatic amines (such as ethylamine, propylamine, butylamine, pentylamine, hexylamine, heptylamine, octylamine, dimethylamine, diethylamine, dipropylamine, dibutylamine, 2-ethylhexylamine, trimethylamine, triethylamine, tripropylamine and tributylamine), alkylenediamines (such as ethylenediamine, diethylenetriamine, triethylenetetramine, tetraethylenepentamine and pentaethylenehexamine), alkanolamines (such as monoethanolamine, diethanolamine, triethanolamine, monoisopropanolamine, diisopropanolamine and triisopropanolamine), alicyclic amines (such as cyclohexylamine and dicyclohexylamine), aromatic amines (such as benzylamine and metaxylenediamine), ethylene oxide adducts of these amines, formamidine, guanidine, amidine, and heterocyclic amines (such as diazabicycloundecene, diazabicyclononene, piperidine, morpholine, piperazine, pyrimidine, pyrrole, imidazole, imidazoline, triazole, thiazole, pyridine and indole). The basic compound is preferably gaseous ammonia or ammonia water.

The amount of basic compound added is preferably of between 0.1 and 10 equivalents, preferably between 0.5 and 5 equivalents, more preferably between 0.5 and 3 equivalents, based on the initial quantity of bis(chlorosulfonyl) imide or salts thereof loaded in the initial reaction step.

During the addition of basic compound, the temperature is preferably maintained between 0° C. and 100° C., more preferably between 15° C. and 90° C. Advantageously, this step of addition of the basic compound may be carried out at the same temperature as the prior reaction step.

Optionally, the method according to the invention may comprise one or several intermediary separation step after reaction and before addition of the basic compound, or after addition of the basic compound and before the precipitation and separation of the onium salt of bis(fluorosulfonyl)imide (or more particularly of the quaternary ammonium salt of bis(fluorosulfonyl)imide even more particularly the ammonium salt of bis(fluorosulfonyl)imide), or both. This intermediary separation step may be performed by any typical separation means known by the person skilled in the art, for example by filtration (for instance under pressure or under vacuum) or decantation.

The next step according to this embodiment consists in precipitating and separating the onium salt of bis(fluorosulfonyl)imide (or more particularly the quaternary ammonium salt of bis(fluorosulfonyl)imide even more particularly the ammonium salt of bis(fluorosulfonyl)imide). The precipitation of the onium salt of bis(fluorosulfonyl)imide (or in particular of the quaternary ammonium salt of bis(fluorosulfonyl)imide even more particularly the ammonium salt of bis(fluorosulfonyl)imide) may be obtained by different means which could be selected by the person skilled in the art. In particular, the means for precipitation the onium salt of bis(fluorosulfonyl)imide (or more particularly the quaternary ammonium salt of bis(fluorosulfonyl)imide even more particularly the ammonium salt of bis(fluorosulfonyl)imide), can be selected from:

removing of at least a part of the solvent by distillation;
decreasing the temperature of the reaction medium;
adding a precipitation solvent; and
any combinations thereof.

The removing of at least one part of the solvent causes the increase of the concentration of the onium salt of bis(fluorosulfonyl)imide (or more particularly of the quaternary ammonium salt of bis(fluorosulfonyl)imide even more particularly the ammonium salt of bis(fluorosulfonyl)imide) within the reaction medium. According to one embodiment, the concentration step may consists in a distillation of the solvent at a temperature comprised between 0° C. and 120° C., preferably between 5° C. and 80° C., more preferably between 10° C. and 70° C. The pressure may be adjusted depending on the nature of the solvent, typically between atmospheric pressure and $10^{-2}$ mbar, preferably between 1 mbar and 500 mbar, and more preferably between 5 mbar and 100 mbar. The distillation may be performed by any typical means known by the person skilled in the art on a continuous process mode or on a discontinuous/batch mode, for example a continuous batch mode solvent evaporation, a batch distillation, a continuous flow distillation of a short path, or a thin film evaporator.

The precipitation of the onium salt of bis(fluorosulfonyl)imide (or more particularly of the quaternary ammonium salt of bis(fluorosulfonyl)imide even more particularly the ammonium salt of bis(fluorosulfonyl)imide) may also be obtained by decreasing the temperature of the reaction mixture containing the salt, which may have been optionally previously concentrated. The temperature of the reaction mixture containing the salt may be decreased to a value below the temperature of solubility of the salt. Preferably, the temperature is decreased to a value comprised between the solvent boiling point and −20° C., more preferably between 70° C. and −10° C., and even more preferably between 30° C. and 0° C. During the reduction of the temperature, the pressure may preferably be kept constant. However, it is not excluded to reduce the pressure simultaneously. It may cause the evaporation of a part of the organic solvent of the reaction mixture. The pressure may be decreased to a value comprised between atmospheric pressure and $10^{-2}$ mbar, preferably between 1 mbar and 500 mbar, and more preferably between 5 mbar and 100 mbar.

Alternatively or in addition, at least one precipitation solvent may be added to reaction mixture containing the salt. Said precipitation solvent may preferably be selected among the organic solvent which are highly soluble within the organic solvent of the reaction mixture, and which are bad solvent for the onium salt of bis(fluorosulfonyl)imide (or more particularly for the quaternary ammonium salt of bis(fluorosulfonyl)imide even more particularly the ammonium salt of bis(fluorosulfonyl)imide). Said precipitation solvent may be selected from the group consisting of halogenated solvents like dichloromethane, dichloroethane, chloroform, and carbon tetrachloride; substituted aromatic hydrocarbon solvents like chlorobenzene and toluene; and alkane solvents like hexane and heptane. Precipitation solvent may preferably be selected among dichloromethane and dichloroethane. The volume ratio between the precipitation solvent and the organic solvent of the reaction mixture may be comprised between 0.1 and 50, preferably between 0.2 and 20, more preferably between 0.5 and 15, and even more preferably between 1 and 10.

The separation of precipitated onium salt of bis(fluorosulfonyl)imide (in particular of the quaternary ammonium salt of bis(fluorosulfonyl)imide even more particularly the ammonium salt of bis(fluorosulfonyl)imide) may be performed by any typical separation means known by the person skilled in the art, for example by filtration. Filtration may be carried out at atmospheric pressure, under pressure or under vacuum, by any means known by the person skilled in the art. Mesh size of the filtration medium may be preferably of 2 micrometer or below, more preferably of 0.45 micrometer or below, and even more preferably of 0.22 micrometer or below. Separated product may be washed once or several times with appropriate solvent.

Finally, the separated solid onium salt of bis(fluorosulfonyl)imide (or in particular the separated quaternary ammonium salt of bis(fluorosulfonyl)imide or more particularly the separated ammonium salt of bis(fluorosulfonyl)imide) is preferably dried to obtain a pure dry product. Drying step may be carried out by any means known by the person skilled in the art, typically under reduced pressure and/or by heating and/or with an inert gas flow, typically a nitrogen flow.

According to one specific embodiment, the salt of bis(fluorosulfonyl)imide according to the invention may be used as starting compound for the preparation of other bis(fluorosulfonyl)imide salts. Accordingly, one subject-matter of the present invention consists in a method for producing an alkali salt of bis(fluorosulfonyl)imide, said method comprises the steps consisting of producing a crystallized salt of bis(fluorosulfonyl)imide according to the method as disclosed above, and reacting said crystallized salt of bis(fluorosulfonyl)imide with an alkali agent to obtain alkali salt of bis(fluorosulfonyl)imide.

The alkali salt of bis(fluorosulfonyl)imide may be selected from the group consisting of lithium salt, sodium salt and potassium salt. Preferably, the alkali salt is a lithium salt, and the alkali salt of bis(fluorosulfonyl)imide obtained by the method according to the invention is lithium salt of bis(fluorosulfonyl)imide $Li^+$ $(FSO_2)_2N^-$ (LiFSI).

The crystallized salt of bis(fluorosulfonyl)imide may be used as such or solubilized in a solvent, according to the nature of the alkali salt. According to a preferred embodiment, the crystallized salt of bis(fluorosulfonyl)imide is solubilized in an organic solvent, hereafter called "alkalinization solvent". Said alkalinization solvent may be selected from the aprotic organic solvents, preferably:

cyclic and acyclic carbonates, for instance ethylene carbonate, propylene carbonate, butylene carbonate, dimethyl carbonate, ethyl methyl carbonate, diethyl carbonate, cyclic and acyclic esters, for instance gamma-butyrolactone, gamma-valerolactone, methyl formate, methyl acetate, methyl propionate, ethyl acetate, ethyl propionate, isopropyl acetate, propyl propionate, butyl acetate, cyclic and acyclic ethers, for instance diethylether, diisopropylether, methyl-t-butylether, dimethoxymethane, 1,2-dimethoxyethane, tetrahydrofuran, 2-methyltetrahydrofuran, 1,3-dioxane, 4-methyl-1,3-dioxane, 1,4-dioxane, amide compounds, for instance N,N-dimethylformamide, N-methyl oxazolidinone, sulfoxide and sulfone compounds, for instance sulfolane, 3-methylsulfolane, dimethylsulfoxide, cyano-, nitro-, chloro- or alkyl-substituted alkane or aromatic hydrocarbon, for instance acetonitrile, valeronitrile, adiponitrile, benzonitrile, nitromethane, nitrobenzene.

According to a preferred embodiment, the alkalinization solvent is selected from the group consisting of ethyl acetate, isopropyl acetate, butyl acetate, ethylene carbonate, dimethyl carbonate, ethyl methyl carbonate, propylene carbonate, valeronitrile and acetonitrile.

The alkali salt may be selected from the group consisting of lithium salt, sodium salt and potassium salt. Preferably, the alkali salt is a lithium salt, and the alkali salt of bis(fluorosulfonyl)imide obtained by the method according to the invention is lithium salt of bis(fluorosulfonyl)imide.

Examples of alkali agents include alkali hydroxide, alkali hydroxide hydrate, alkali carbonate, alkali hydrogen carbonate, alkali chloride, alkali fluoride, alkoxide compounds, alkyl alkali compounds, alkali acetate, and alkali oxalate. Preferably, alkali hydroxide or alkali hydroxide hydrate may be used. If the alkali agent is a lithium salt, then the lithium salt may be selected from the group consisting of lithium hydroxide LiOH, lithium hydroxide hydrate LiOH·$H_2O$, lithium carbonate $Li_2CO_3$, lithium hydrogen carbonate $LiHCO_3$, lithium chloride LiCl, lithium fluoride LiF, alkoxide compounds such as $CH_3OLi$ and EtOLi; alkyl lithium compounds such as EtLi, BuLi and t-BuLi, lithium acetate $CH_3COOLi$, and lithium oxalate $Li_2C_2O_4$. Preferably, lithium hydroxide LiOH or lithium hydroxide hydrate LiOH·$H_2O$ may be used.

Said alkali agent may be added as a solid, as a pure liquid or as an aqueous or organic solution.

The amount of alkali agent used is preferably comprised between 0.5 and 5 mol, more preferably between 0.9 and 2 mol, and even more preferably between 1 and 1.5 mol, per 1 mol of the onium salt of bis(fluorosulfonyl)imide (or in particular of the quaternary ammonium salt of bis(fluorosulfonyl)imide even more particularly the ammonium salt of bis(fluorosulfonyl)imide).

The reaction may be carried out at a temperature of between 0° C. and 50° C., more preferably between 15° C. and 35° C., and even more preferably at about the room temperature. Preferably, the reaction is carried out at atmospheric pressure, but it is not excluded to work below or above atmospheric pressure, for instance between 5 mbar and 1.5 bar, preferably between 5 mbar and 100 mbar.

Further treatments may be carried out in order to recover very pure alkali salt of bis(fluorosulfonyl)imide. The reaction medium may be a biphasic (aqueous/organic) solution, especially when the alkali agent is an aqueous solution. In this case, the method may comprise a phase separation step, during which the aqueous phase is removed and the alkali salt of bis(fluorosulfonyl)imide is recovered in the organic phase. Additional steps may comprise filtration, concentration, extraction, recrystallization, purification by chromatography, drying and/or formulation.

Advantageously, the alkali salt of bis(fluorosulfonyl)imide obtained by the method according to the invention has a very high purity. It may show a purity of salts above 90%, preferably above 95%, more preferably between 99% and 100%.

Preferably, it may show the following contents of anions:
a chloride ($Cl^-$) content of below 10 000 ppm, preferably below 5 000 ppm, more preferably below 1 000 ppm, more preferably below 500 ppm, more preferably below 100 ppm, more preferably below 50 ppm, more preferably below 20 ppm; and/or a fluoride ($F^-$) content of below 10 000 ppm, preferably below 5 000 ppm, more preferably below 1 000 ppm, more preferably below 500 ppm, more preferably below 100 ppm, more preferably below 50 ppm, more preferably below 20 ppm; and/or a sulfate ($SO_4^{2-}$) content of below 30 000 ppm, preferably below 10 000 ppm, more preferably below 5 000 ppm.

Preferably, it may show the following contents of metal elements:
an iron (Fe) content of below 1 000 ppm, preferably below 800 ppm, more preferably below 500 ppm; and/or a chromium (Cr) content of below 1 000 ppm, preferably below 800 ppm, more preferably below 500 ppm; and/or a nickel (Ni) content of below 1 000 ppm, preferably below 800 ppm, more preferably below 500 ppm; and/or a zinc (Zn) content of below 1 000 ppm, preferably below 100 ppm, more preferably below 10 ppm, and/or a copper (Cu) content of below 1 000 ppm, preferably below 100 ppm, more preferably below 10 ppm; and/or a bismuth (Bi) content of below 1 000 ppm, preferably below 100 ppm, more preferably below 10 ppm.

Additionally, when the alkali salt of bis(fluorosulfonyl)imide is not sodium bis(fluorosulfonyl)imide, it may show:
a sodium (Na) content of below 10 000 ppm, preferably below 5 000 ppm, more preferably below 500 ppm.

Additionally, when the alkali salt of bis(fluorosulfonyl)imide is not potassium bis(fluorosulfonyl)imide, it may show:
a potassium (K) content of below 10 000 ppm, preferably below 5 000 ppm, more preferably below 500 ppm.

Thanks to its very high purity, the alkali salt of bis(fluorosulfonyl)imide, and preferably the lithium bis(fluorosulfonyl)imide, obtainable by the method according to the invention, may be advantageously used in electrolyte compositions for batteries.

Contrary to the prior art method, the method for producing an alkali salt of bis(fluorosulfonyl)imide according to the invention starts from a salt of bis(fluorosulfonyl)imide, preferably an onium salt of bis(fluorosulfonyl)imide, more preferably a quaternary ammonium salt of bis(fluorosulfonyl)imide and even more preferably an ammonium salt of bis(fluorosulfonyl)imide, which has been crystallized within a halogenated alcohol. Without wishing to be bound by any theory, the inventors believe that this method is advantageous to obtain a final product of a very high purity, without the necessity to carry out demanding final purification steps. Consequently, the process according to the invention is as a whole more efficient and less expensive, whereas the final product is of the utmost quality.

Generally speaking, all raw materials used in the method according to the invention, including solvents, reagents, etc., may preferably show very high purity criteria. Preferably, their content of metal components such as Na, K, Ca, Mg, Fe, Cu, Cr, Ni, Zn, is below 10 ppm, more preferably below 2 ppm.

In addition, some of the steps or all steps of the method according to the invention are advantageously carried out in equipment capable of withstanding the corrosion of the reaction medium. For this purpose, materials are selected for the part in contact with the reaction medium that are corrosion-resistant, such as the alloys based on molybdenum, chromium, cobalt, iron, copper, manganese, titanium, zirconium, aluminum, carbon and tungsten, sold under the Hastelloy® brands or the alloys of nickel, chromium, iron and manganese to which copper and/or molybdenum are added, sold under the name Inconel® or Monel™, and more particularly the Hastelloy C276 or Inconel 600, 625 or 718 alloys. Stainless steels may also be selected, such as austenitic steels and more particularly the 304, 304L, 316 or 316L stainless steels. A steel having a nickel content of at most 22% by weight, preferably of between 6% and 20% and more preferentially of between 8% and 14%, is used. The 304 and 304L steels have a nickel content that varies between 8% and 12%, and the 316 and 316L steels have a nickel content that varies between 10% and 14%. More particularly, 316L steels are chosen. Use may also be made of equipment consisting of or coated with a polymeric compound resistant to the corrosion of the reaction medium. Mention may in particular be made of materials such as PTFE (polytetrafluoroethylene or Teflon) or PFA (perfluoroalkyl resins). Glass equipment may also be used. It will not be outside the scope of the invention to use an equivalent material. As other materials capable of being suitable for being in contact with the reaction medium, mention may also be made of graphite derivatives. Materials for filtration have to be compatible with the medium used. Fluorinated polymers (PTFE, PFA), loaded fluorinated polymers (Viton™), as well as polyesters (PET), polyurethanes, polypropylene, polyethylene, cotton, and other compatible materials can be used. Regarding the material which might be used for the filtration membrane, mention may be made if cellulose, PE/PP, polyurethane, and fluorinated materials like PTFE and PFA.

Should the disclosure of any patents, patent applications, and publications which are incorporated herein by reference conflict with the description of the present application to the extent that it may render a term unclear, the present description shall take precedence.

The invention will now be further described in examples, which are given by way of illustration and which are no intended to limit the specification or the claims in any manner.

EXAMPLES

Example 1: Synthesis of $NH_4FSI$

The process has been carried out in a 500 mL Hastelloy reactor under $N_2$ with stirring means, a double jacket for thermal regulation, a condenser, a pressure regulator means and a liquid or gas addition means. At room temperature, 200 g of ethyl methyl carbonate were introduced, and 36 g of anhydrous $NH_4F$ was suspended. 50 g of molten CSIH was added gradually during 1 hour, and the mixture was heated at 65° C. under stirring during 15 hours. It was cooled to room temperature and 12 g of $NH_3$ (aq) (ammonia water) was added. The obtained mixture was stirred at room temperature for 1 h and then filtered. The filtrate was concentrated under reduced pressure to dryness to afford 40 g of $NH_4FSI$ as a white solid.

Example 2: Synthesis of LiFSI—Comparative Example 40 g of solid $NH_4FSI$ obtained according to Example 1 was solubilized in 400 g ethyl methyl carbonate. 9.2 g of a 25 wt. % aqueous solution of $LiOH \cdot H_2O$ was added. The obtained biphasic mixture was stirred during 1 hour at room temperature, and then decanted. The organic phase was recovered and concentrated by rotary evaporator at 20° C. under reduced pressure (5 mbar). A concentrated solution of LiFSI at 30 wt. % in ethyl methyl carbonate is obtained.

FIG. 1 shows a cyclic voltammetry diagram obtained by cycling 5 times the solution of LiFSI at 30 wt. % in EMC obtained in Example 2.

Cyclic voltammetry (CV) was carried out using 3-electrode cell and a VSP (BioLogic); the CV tests were performed between 0-3.0 V vs. $Li/Li^+$ at a scan rate of $1 \text{ mV} \cdot \text{s}^{-1}$. The first CV cycle starts from OCV with a reductive scan. Five CV cycles were recorded in total.

Example 3: Synthesis of LiFSI According to the Invention 40 g of solid $NH_4FSI$ obtained according to Example 1 was dissolved in 60 g of TFE at 60° C. for 1 h, then the resulting solution was cooled down to 0° C. for 3 h. The crystallized $NH_4FSI$ was filtered off, washed with cold TFE, and dried under vacuum to afford 33 g of $NH_4FSI$ crystal.

33 g of $NH_4FSI$ crystal was solubilized in 300 g ethyl methyl carbonate. 7.6 g of a 25 wt. % aqueous solution of $LiOH \cdot H_2O$ was added. The obtained biphasic mixture was stirred during 1 hour at room temperature, and then decanted. The organic phase was recovered and concentrated by rotary evaporator at 20° C. under reduced pressure (5 mbar). A concentrated solution of LiFSI at 30 wt. % in ethyl methyl carbonate is obtained.

Figure 2:
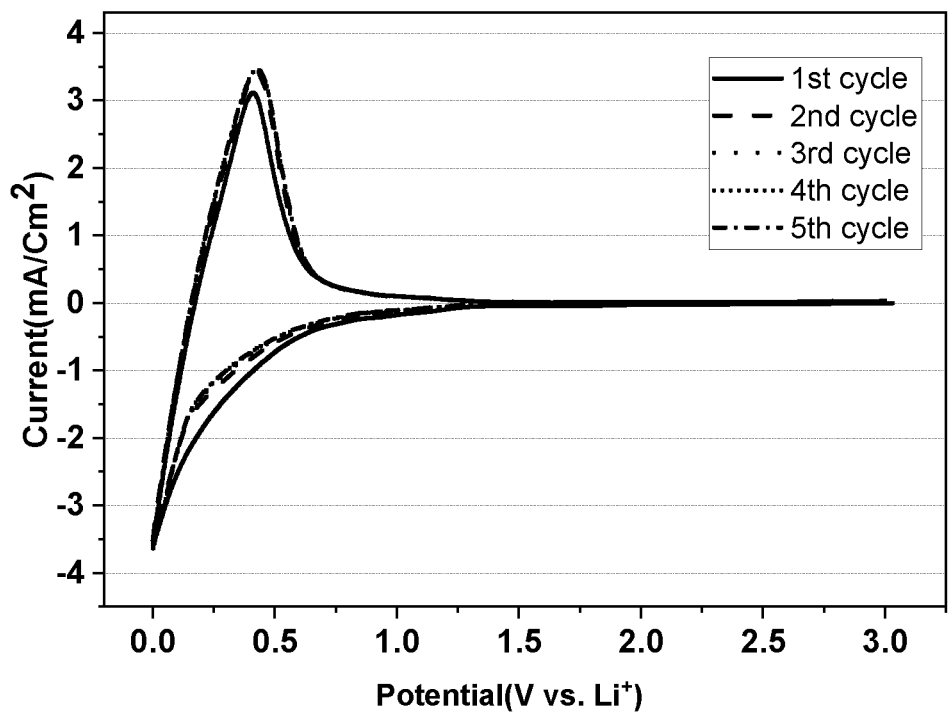
FIG. 2 shows a cyclic voltammetry diagram obtained by cycling 5 times the solution of LiFSI at 30 wt. % in EMC obtained in Example 3.

FIG. 2 shows a cyclic voltammetry diagram obtained by cycling 5 times the solution of LiFSI at 30 wt. % in EMC obtained in Example 3. Conditions of CV test were identical to the conditions of Example 2.

By comparing FIG. 1 and FIG. 2, we can see that the current range recorded with the composition of Example 3 (according to the invention) is significantly higher (around 7 $mA/cm^2$) than the current range recorded with the composition of Example 2 (comparative) (around 4 $mA/cm^2$). Furthermore, the current stays rather stable from the $1^{st}$ until the $5^{th}$ cycle with the composition of Example 3 (according to the invention) whereas the cycling curves change with the composition of Example 2 (comparative). In addition, we can note that the current shows some shoulder after 0.5V on the cyclic voltammetry diagram of FIG. 1 (comparative), whereas this shoulder does not exist in the diagram of FIG. 2 (invention).

These data show that the salt of bis(fluorosulfonyl)imide according to the invention is more suitable to be used in electrolyte compositions for batteries, than the comparative salt.

Example 4: Synthesis of $NH_4FSI$

The process has been carried out in a 500 mL Hastelloy reactor under $N_2$ with stirring means, a double jacket for thermal regulation, a condenser, a pressure regulator means and a liquid or gas addition means. At room temperature, 200 g of butyl acetate were introduced, and 44 g of anhydrous NH$_4$F was suspended. 60 g of molten CSIH was added gradually during 1 hour, and the mixture was heated at 65° C. under stirring during 15 hours. It was cooled to room temperature and 15 g of NH$_3$ (aq) (ammonia water) was added. The obtained mixture was stirred at room temperature for 1 h and then filtered. The filtrate was concentrated under reduced pressure to dryness to afford 45 g of NH$_4$FSI as a white solid.

Example 5: Synthesis of LiFSI According to the Invention 45 g of solid NH$_4$FSI obtained according to Example 4 was dissolved in 60 g of TFE at 60° C. for 1 h, then the resulting solution was cooled down to 0° C. for 3 h. The crystallized NH$_4$FSI was filtered off, washed with cold TFE, and dried under vacuum to afford 37 g of NH$_4$FSI crystal. 37 g of NH$_4$FSI crystal was solubilized in 300 g ethyl methyl carbonate. 8.5 g of a 25 wt. % aqueous solution of LiOH·H$_2$O was added. The obtained biphasic mixture was stirred during 1 hour at room temperature, and then decanted. The organic phase was recovered and concentrated by rotary evaporator at 20° C. under reduced pressure (5 mbar). A concentrated solution of LiFSI at 30 wt. % in ethyl methyl carbonate is obtained.

Example 6: Synthesis of Raw N(CH$_3$)$_4$FSI

The process has been carried out in a 500 mL Hastelloy reactor under N$_2$ with stirring means, a double jacket for thermal regulation, a condenser, a pressure regulator means and a liquid or gas addition means. At room temperature, 300 g of butyl acetate were introduced, and 110 g of anhydrous N(CH$_3$)$_4$F was suspended. 60 g of molten CSIH was added gradually during 1 hour, and the mixture was heated at 65° C. under stirring during 15 hours. It was cooled to room temperature and 15 g of NH$_3$ (aq) (ammonia water) was added. The obtained mixture was stirred at room temperature for 1 h and then filtered. The filtrate was concentrated under reduced pressure to dryness to afford 42 g of N(CH$_3$)$_4$FSI as a white solid.

Example 7: Preparation of N(CH$_3$)$_4$FSI According to the Invention 42 g of solid N(CH$_3$)$_4$FSI obtained according to Example 6 was dissolved in 160 g of hexafluoroisopropanol (HFIP) at 58° C. for 1 h, then the resulting solution was cooled down to −15° C. for 3 h. The crystallized N(CH$_3$)$_4$FSI was filtered off, washed with cold HFIP, and dried under vacuum to afford 33 g of N(CH$_3$)$_4$FSI crystal.

Example 8: Synthesis of NH$_4$FSI

The process has been carried out in a 500 mL Hastelloy reactor under N$_2$ with stirring means, a double jacket for thermal regulation, a condenser, a pressure regulator means and a liquid or gas addition means. At room temperature, 200 g of dimethyl carbonate were introduced, and 44 g of anhydrous NH$_4$F was suspended. 60 g of molten CSIH was added gradually during 1 hour, and the mixture was heated at 65° C. under stirring during 15 hours. It was cooled to room temperature and 15 g of NH$_3$ (aq) (ammonia water) was added. The obtained mixture was stirred at room temperature for 1 h and then filtered. The filtrate was concentrated under reduced pressure to dryness to afford 42 g of NH$_4$FSI as a white solid.

Example 9. Synthesis of KFSI According to the Invention 42 g of solid NH$_4$FSI obtained according to Example 8 was dissolved in 60 g of TFE at 60° C. for 1 h, then the resulting solution was cooled down to 0° C. for 3 h. The crystallized NH$_4$FSI was filtered off, washed with cold TFE, and dried under vacuum to afford 35 g of NH$_4$FSI crystal.

35 g of NH$_4$FSI crystal was solubilized in 300 g dimethyl carbonate. 8.0 g of a 25 wt. % aqueous solution of LiOH·H$_2$O was added. The obtained biphasic mixture was stirred during 1 hour at room temperature, and then decanted. The organic phase was recovered and concentrated by rotary evaporator at 20° C. under reduced pressure (5 mbar). A concentrated solution of LiFSI at 30 wt. % in dimethyl carbonate is obtained.

The invention claimed is:

1. A method for producing a salt of bis(fluorosulfonyl) imide in the form of a solid crystallized compound and containing a salt of bis(fluorosulfonyl)imide in the form of a solid crystallized compound and containing from 0.01 ppm to 10,000 ppm of a halogenated alcohol, where the salt is represented by the formula (I):

$$[(FSO_2)_2N^-]_n M^{n+} \qquad (1),$$

wherein $M^{n+}$ represents an ammonium cation, and n is an integer from 1 representing the valence of the ammonium cation $M^{n+}$, said method comprising crystallizing a salt of bis(fluorosulfonyl)imide within a crystallization solvent comprising at least a halogenated alcohol.

2. The method according to claim 1, wherein crystallizing a salt of bis(fluorosulfonyl)imide is a recrystallization comprising:
providing the salt of bis(fluorosulfonyl)imide,
dissolving said salt of bis(fluorosulfonyl)imide within said crystallization solvent,
causing the salt of bis(fluorosulfonyl)imide to crystallize; and
recovering the salt of bis(fluorosulfonyl)imide in the form of a solid crystallized compound.

3. The method according to claim 1, wherein the halogenated alcohol is a fluorinated alcohol selected from the group consisting of nonafluoro-tert-butanol, hexafluoroisopropanol, pentafluorophenol, difluoroethanol and trifluoroethanol.

4. The method according to claim 1, wherein the crystallization solvent comprises a mixture of at least one halogenated alcohol and another solvent which is not a halogenated alcohol selected from the group consisting of ethyl methyl carbonate, dimethyl carbonate; ethyl acetate, butyl acetate, ethyl propionate; dichloromethane, 1,2-dichloroethane; benzene, toluene; pentane, hexane, heptane; valeronitrile, and acetonitrile.

5. The method according to claim 1, wherein the crystallization solvent contains water, at a content between 0.01% and 20%, based on the total weight of the crystallization solvent.

6. The method according to claim 1, wherein the salt of bis(fluorosulfonyl)imide in the form of a solid crystallized compound is ammonium bis(fluorosulfonyl)imide; and the salt of bis(fluorosulfonyl)imide is ammonium bis(fluorosulfonyl)imide produced according to the following process:

reacting bis(chlorosulfonyl)imide or salts thereof with ammonium fluoride to produce ammonium salt of bis(fluorosulfonyl)imide; and precipitating and separating the ammonium salt of bis(fluorosulfonyl)imide.

7. A method for producing an alkali salt of bis(fluorosulfonyl)imide, the method comprising: producing the salt of bis(fluorosulfonyl)imide in the form of a solid crystallized compound according to claim 1 and reacting said solid crystallized compound of bis(fluorosulfonyl)imide with an alkali agent to obtain the alkali salt of bis(fluorosulfonyl)imide.

* * * * *